July 27, 1965  H. A. BERTRAND  3,197,234
SAFETY DEVICE FOR VEHICLE PASSENGERS
Filed June 10, 1963  3 Sheets-Sheet 1
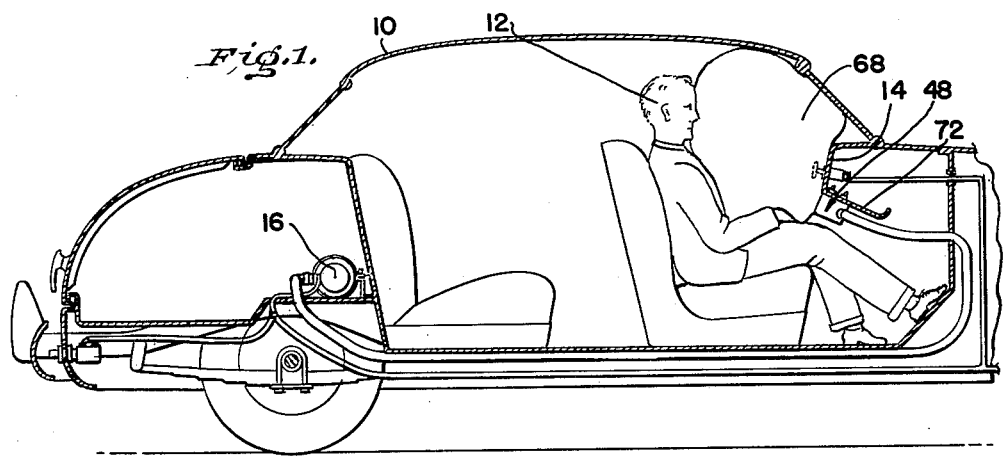
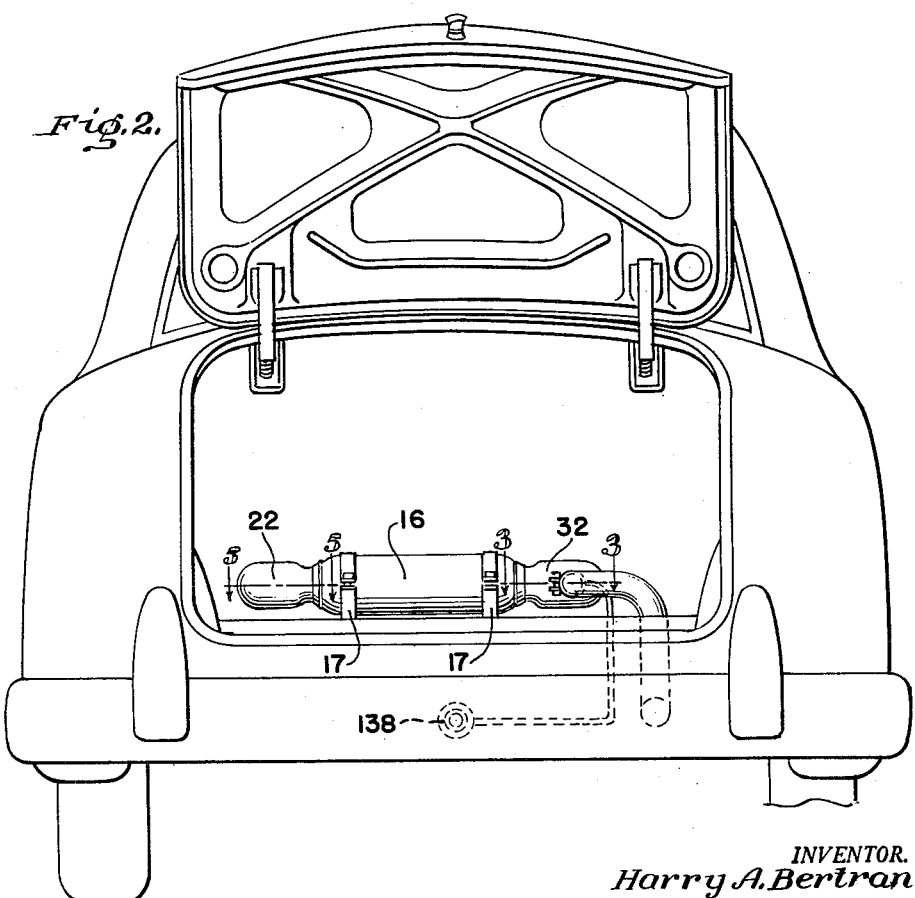
INVENTOR.
Harry A. Bertrand
BY
Ross W. Campbell
ATTORNEY July 27, 1965   H. A. BERTRAND   3,197,234
SAFETY DEVICE FOR VEHICLE PASSENGERS
Filed June 10, 1963   3 Sheets-Sheet 2
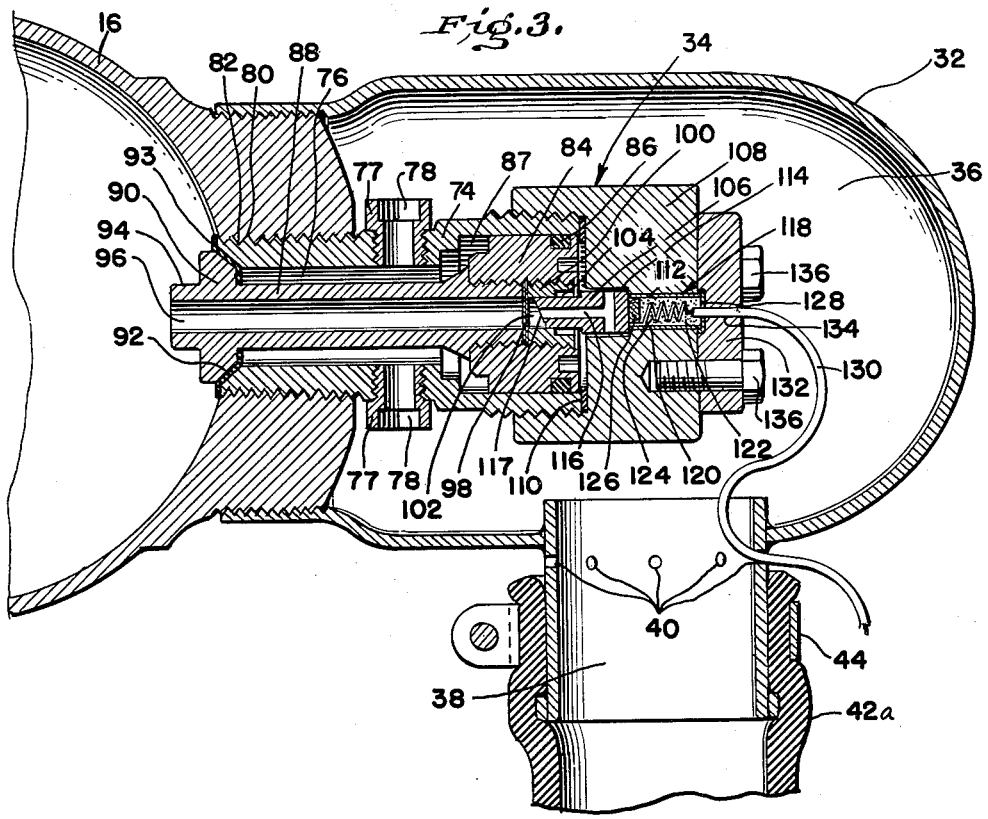
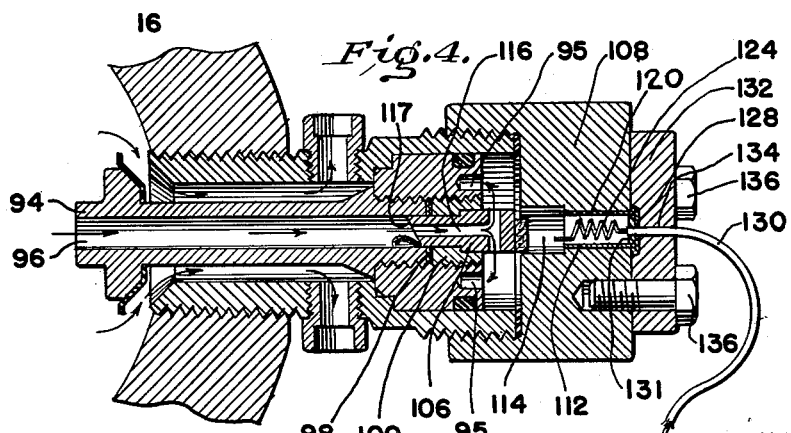
INVENTOR
Harry A. Bertrand
BY
Ross W. Campbell
ATTORNEY

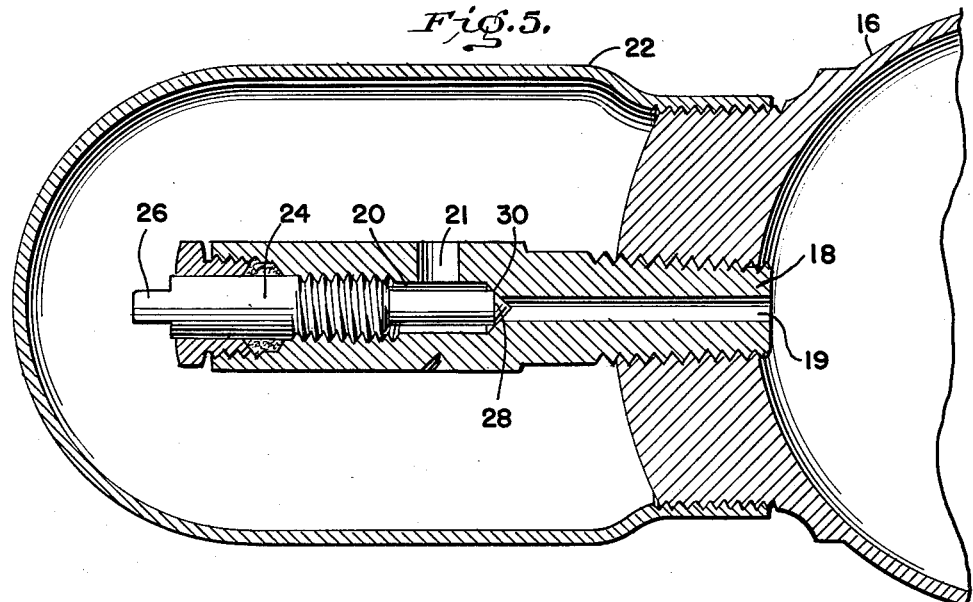
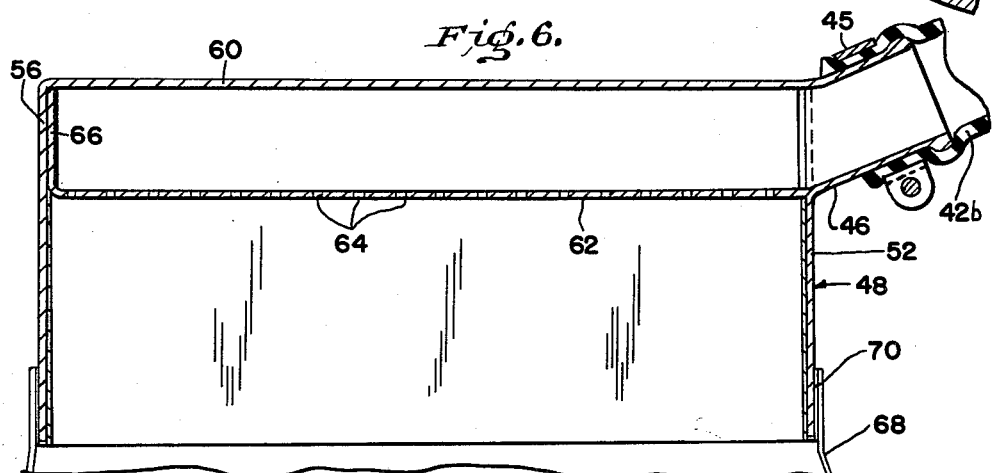
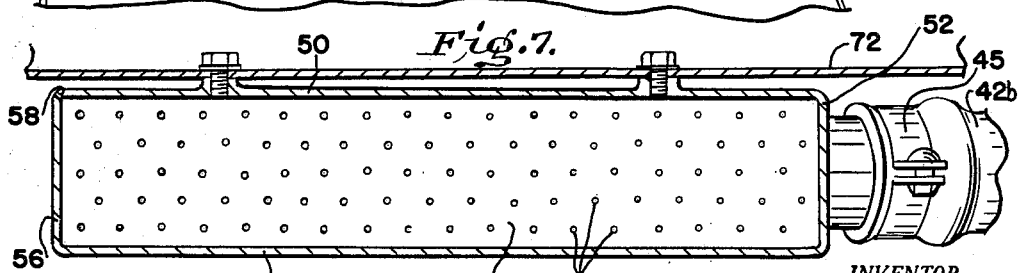
INVENTOR.
Harry A. Bertrand
BY
Ross W. Campbell
ATTORNEY United States Patent Office 3,197,234
Patented July 27, 1965

3,197,234
SAFETY DEVICE FOR VEHICLE PASSENGERS
Harry A. Bertrand, Prairie Ronde Township, Kalamazoo County, Mich. (R.R. 2, Lawton, Mich.)
Filed June 10, 1963, Ser. No. 287,740
2 Claims. (Cl. 280—150)

This invention relates to safety devices for the protection of passengers in vehicles and, more particularly, relates to an inflatable cushion and a system for effecting extremely rapid inflation thereof when a collision occurs. This application is a continuation-in-part, of my application Serial No. 84,072, filed January 23, 1961, and entitled "Safety Device for Vehicle Passengers" which is now abandoned.

It has been suggested previously to provide an inflatable bag or bags within the passenger compartment of a vehicle, such as an automobile, together with a system for effecting inflation of the bag when the vehicle collides with another object. My prior Patent Nos. 2,834,606 and 2,834,609 disclose examples of this type of apparatus.

Tests have shown that when an automobile travelling at about 28 m.p.h. collides with a stationary barrier, the head of a human-size dummy in the front seat will strike the dashboard approximately 60 milliseconds after the instant of impact where the dummy is restrained at the hips by a seat belt. Therefore, a human passenger in the same location would do likewise except that he might be able to slow down and, at slow speeds, possibly prevent such contact by moving his body appropriately. Further, a driver would strike the steering wheel in less time. Where higher speeds are involved this time becomes progressively shorter. Therefore, it is essential that the inflatable bag or bags in safety devices of the type mentioned above be in a substantially fully inflated condition a very short time after impact, i.e., on the order of 1 or 2 milliseconds, if it is to be completely effective for the intended purposes.

The inflatable bag is of relatively large volume and, consequently, a relatively great amount of fluid must be supplied in order to inflate same. The supply of the fluid from a reservoir thereof is controlled by a valve which is actuated in response to a collision. The valve, therefore, is of prime importance to the effective functioning of the safety device. The valve must be sufficiently sturdy, durable and insensitive to relatively minor shocks that it will not be actuated accidentally, such as if the vehicle goes over a bump or a hole, but it must be capable of positive actuation upon the occurrence of a collision. The valve must have an extremely fast response time and must be capable of effecting the supply of a large amount of fluid to the bag in a short time. At the same time, the valve must be relatively compact and inexpensive to manufacture so that it can be placed in vehicles easily, conveniently and relatively inexpensively.

Accordingly, it is an object of this invention to provide an improved safety device for vehicles comprising an inflatable bag and a system including an improved valve for controlling supply of fluid to the bag so that it can be substantially fully inflated within a few milliseconds after a collision occurs.

It is a further object of this invention to provide an improved safety device, as aforesaid, in which the valve meets the above-named requirements as well as other requirements related thereto.

Other objects and advantages of the invention will become apparent to persons of ordinary skill in the art after reading the following description and inspecting the accompanying drawings.

In the drawings:

FIGURE 1 is a longitudinal, vertical, sectional view through a portion of an automobile body having an embodiment of the present invention mounted therein and showing an inflatable bag, forming part of the invention, in inflated condition.

FIGURE 2 is a rear view of an automobile trunk with a high pressure tank, tank filling means, valve means, and fluid or gas conduit means mounted therein and associated with pressure-sensitive electrical actuaitng means indicated by dotted lines.

FIGURE 3 is an enlarged fragmentary sectional view taken substantially along line 3—3 of FIGURE 2 and showing valve means in unactuated condition.

FIGURE 4 is a view similar to a portion of FIGURE 3 but showing the valve means as it would appear during inflation of the inflatable safety bag.

FIGURE 5 is an enlarged fragmentary sectional view taken substantially along line 5—5 of FIGURE 2 and showing tank filling means.

FIGURE 6 is a plan view in longitudinal section of an expansion and distribution box.

FIGURE 7 is a front elevation of an expansion and distribution box connected to a rigid vehicle member.

Referring now more particularly to the drawings, there is shown therein a vehicle 10 with a passenger 12 seated before an instrument panel 14.

A high pressure tank 16 contining a fluid or gas, such as nitrogen gas or air, under high pressure, is detachably mounted in a convenient location, such as the trunk of the vehicle, by straps 17 connected to a metal vehicle member (not shown). Tank filler means, such as threaded stem 18 having a longitudinal bore 19, a counterbore 20, and an entrance port 21 opening into said counterbore at a right angle thereto, is threadably inserted into one end of tank 16 and protected by a cover 22 threadably engaged to said end of tank 16. A threaded plug plug 24 having a boss 26 at one end thereof and a conical valve head 28 at the other end is threaded within counterbore 20 to seat against a valve seat 30 at the juncture of bore 19 and counterbore 20 to removably seal bore 19 and entrance port 21.

A valve cover 32 is threadably engaged to the other end of tank 16 to protect a valve 34, more particularly described hereinafter, and to form an expansion chamber 36. An outlet tube 38, formed from a short length of hollow pipe, is attached near one end of valve cover 32 to provide an outlet from expansion chamber 36, and contains a plurality of externally vented, radially spaced, fluid or gas escape ports 40.

One end of a flexible fluid or gas conduit 42 embraceably surrounds the other end of outlet tube 38 and is so retained by a clamp 44. The other end of conduit 42 is similarly connected by a clamp 45 to one end of an inlet tube 46 formed from a short length of hollow pipe. The other end of inlet tube 46 is connected to an expansion and distribution box 48.

I have found it convenient to construct expansion and distribution box 48 in the form of an elongated rectangular box open along one side, composed of an elongated rectangular metal plate folded transversely to form top plate 50, side plate 52, bottom plate 54, and side plate 56, and welded at the juncture 58 of top plate 50 and side plate 56. A rectangular metal back plate 60 is attached by welding or other convenient means to top plate 50, bottom plate 54 and side plates 52 and 56. A rectangular metal baffle plate 62, containing a plurality of small apertures 64, is inserted within expansion and distribution box 48 and attached by welding or other convenient means along its perimeter to top plate 50, bottom plate 54, and side plates 52 and 56, so as to be disposed in spaced, parallel arrangement with back plate 60. One end of perforated baffle plate 62 may be bent at right angles to form a flange 66 and attached, as by welding, to side plate 56, if desired. Inlet tube 46 is connected to a suitably shaped shaped aperture in expansion and distribution box 48 at a convenient point between baffle plate 62 and back plate 60, and secured to expansion and distribution box 48 by welding to form a fluid- and gas-tight connection.

The open end of a flexible safety bag 68 surrounds and is attached by adhesive or other conventional means to the open end of expansion and distribution box 48, as shown at 70. Expansion and distribution box 48 is attached to a rigid vehicle member, such as instrument panel 14, by a bracket 72 and disposed so that safety bag 68, when inflated, will provide a cushion protecting one or more vehicle passengers from contact with a rigid surface or member of the vehicle, such as instrument panel 14.

Referring now more particularly to the construction of valve 34, in referring to the parts of the valve, the term "forward" shall refer to a direction toward the left in FIGURE 3 and the term "rear" shall refer to a direction toward the right in FIGURE 3. The valve 34 comprises a plunger cylinder 74, having a longitudinal cylindrical bore 76 with one or more adapters 77 threadably connected thereto and extending at right angles radially therefrom, each adapter having a fluid or gas escape port 78 therein, is threadably engaged by a set of forward threads 80 to a matingly threaded aperture 82 in high pressure tank 16. An annular, internally threaded cylindrical plunger 84, having an external gasket 86 thereon, is coaxially and slidingly disposed within a counterbore 87 at the rear of plunger cylinder 74. A valve stem 88, having a valve head 90 at the forward end thereof disposed to seat against a valve seat 92 at the forward end of plunger cylinder 74, is threadably engaged at its rear end partly within annular plunger 84. A seal is provided intermediate valve head 90 and valve seat 92 to form a removable gas seal between valve head 90 and valve seat 92 and to space the rear end of plunger 84 from the internal forward face of cylinder head 108 for a purpose more particularly hereinafter described. I found it convenient to use either an annular disc-shaped seal 93 vulcanized to the valve head as shown in FIGURE 3 or a seal formed in the shape of an annular ring retained in a circular groove (not shown) in the valve head, to seat against valve seat 92. A boss 94 is provided on valve head 90 and a pair of gripping holes 95 (FIGURE 4), adapted to be seized by a pair of spaced projections at the end of a wrench, are provided in the rear end of annular plunger 84 for use in disconnecting valve stem 88 and valve head 90 from annular plunger 84. A longitudinal bore 96 extends coaxially through boss 94, valve head 90 and valve stem 88, and opens directly into high pressure tank 16.

A thin circular diaphragm 98 is retained within the bore of annular plunger 84 against the rear end of valve stem 88 by an annular plug 100 threadably retained within the bore of annular plunger 84 at the rear thereof. Annular plug 100 contains a bore 102 coaxial with and of the same diameter as bore 96 and has a counterbore 104 at the rear thereof to receive the forward portion of the enlarged head of a plunger pin 106 hereinafter described.

An annular, internally threaded cylinder head 108 surrounds and is threadably engaged to plunger cylinder 74 at the rear thereof. An annular gasket 110 is provided intermediate plunger cylinder 74 and cylinder head 108, with an internal diameter less than the external diameter of annular plunger 84 to prevent the passage of gas through the threaded connection of plunger 84 and cylinder head 108. Cylinder head 108 contains a bore 112 and a counterbore 114 coaxial with bores 96, 102 and counterbore 104.

A plunger pin 106, having an enlarged head at the rear thereof, is provided. The enlarged head of plunger pin 106 is slidingly received within counterbore 114 of cylinder head 108 and the forward portion of said plunger pin is slidingly received within bore 102 of annular plug 100. A T-shaped fluid or gas escape channel 116 is provided within plunger pin 106. The stem or main portion of T-shaped channel 116 is longitudinally disposed in the forward position of plunger pin 106 coaxial with bore 96 of valve stem 88 and is connected at its rear end within the enlarged head of said plunger pin to the transverse portion which forms the crossbar of said T. These oppositely disposed transverse channels of T-shaped channel 116 are positioned so as to open into the space provided between annular plunger 84 and cylinder head 108 when plunger pin 106 is in its forwardmost position and the front shoulder of its enlarged head is in contact with the forward shoulder of counterbore 104. The forward end 117 of plunger pin 106 is sloped to provide a sharp forward edge capable of penetrating diaphragm 98.

Bore 112 is disposed to contain an explosive cartridge 118 consisting of a metal cartridge casing 120 containing an explosive powder charge 122 and a thin coiled wire 124 of high electrical resistance retained therein by packing 126. I have found it convenient to form explosive cartridge 118 from a twenty-two caliber short cartridge by removing the primer, projectile and charge therefrom and drilling a small hole 128 in the rear end thereof to receive an electrical wire 130. However, the explosive cartridge 118 can be of different construction and can, for example, consist of an explosive gas held within a suitable frangible casing, there also being provided means for igniting the gas in response to a collision. One end of coiled wire 124 is attached, as by soldering, to the wall of cartridge casing 120 and the other end is connected to electrical wire 130, the intermediate portion of wire 124 being suspended within cartridge casing 120 and in contact with explosive powder charge 122. A small insulating washer 131 (FIGURE 4) of dielectric material is placed within cartridge casing 120 and surrounding wire 130 intermediate the rear of cartridge casing 120 and the soldered junction of wire 130 and coiled wire 124, to prevent electrical short circuiting of said junction and wire 124 with the metal cartridge casing 120.

A recessed cartridge backing plate 132 containing a small aperture 134 therein through which extends wire 130 is attached to the rear of cylinder head 108 by a plurality of cap screws 136 to retain explosive cartridge 118 within bore 112. I have found it convenient to provide a thin annular gasket (not shown) to closely surround wire 130 at the rear of cartridge 118 and within the recess of backing plate 132 to prevent the escape through aperture 134 of gas generated within cartridge 118 when exploded.

Diaphragm 98 is formed of a material and of a thickness sufficient to withstand the pressure of the fluid or gas contained within high pressure tank 16 and bore 96 and to retain said fluid or gas within said tank and within the portion of said bore forward of said diaphragm, yet capable of being penetrated by the sloping forward end 117 of plunger pin 106 when said pin is forced forward by the pressure generated within bore 112 by the explosion of cartridge 118. For this purpose I have found a thin metallic disc to be convenient. Wire 124 is selected to have adequately high electrical resistance rapidly to provide sufficient heat to ignite powder charge 122 practically instantly upon the passage of electrical current through said wire. I have used tungsten wire successfully for this purpose.

The other end of electrical wire 130 is threaded through one of discharge ports 40 in outlet tube 38 and is connected to one terminal of a sensitive electrical switch 138, the other terminal of said switch being connected to one pole of an electric battery, such as the battery conventionally used to energize the electrical system of the vehicle. The other pole of said battery is connected to the frame of the vehicle as in the conventional manner.

Cartridge casing 120 is also connected to the frame of the vehicle through the metal parts of valve 34, metal tank 16, and metal straps 17 securing high pressure tank 16, thus providing an electrical circuit to energize high resistance wire 124 when pressure sensitive electrical switch 138 is actuated. Pressure sensitive switch 138, and similar switches electrically connected in parallel therewith, strategically located around the bumpers and body of the vehicle at points of probable collision contact of the vehicle with an obstacle or another vehicle.

In use, upon forceful contact with an obstacle by the switch 138 or by vehicle components connected with the switch so as to activate it upon such contact, the switch is closed, energizing the electrical circuit and causing a flow of electrical current through coiled high resistance wire 124. The heat generated by energized high resistance wire 124 ignites powder 122 to produce an explosion the force of which forces plunger pin 106 rapidly forward so that the forward, sloping end 117 thereof penetrates diaphragm 98. The fluid or gas contained within high pressure tank 16 and the forward portion of bore 96 then passes through ruptured diaphragm 98, impinging on the rear of T-shaped channel 116 of plunger pin 106 and thereby forcing said plunger pin backward against the rear of counterbore 114 to leave unobstructed the flow of fluid or gas through ruptured diaphragm 98 and through bores 96, 102 and counterbore 104 to impinge upon the rear surface of annular plunger 84. Annular plunger 84, valve stem 88 and valve head 90 are forced forward by the pressure of the fluid or gas, thus unseating valve head 90 from valve seat 92, opening the valve and permitting the entrance of a greater flow of fluid or gas from cylinder 16 into bore 76.

To insure the passage of fluid or gas through diaphragm 98 to impinge upon the rear surface of annular plunger 84 in the event that plunger pin 106 should stick in its forward position within diaphragm 98, T-shaped channel 116 within plunger pin 106 provides a passage for the fluid or gas past diaphragm 98 and into the space provided between annular plunger 84 and cylinder head 108 so as to insure impingement of the fluid or gas upon the rear surface of annular plunger 84.

From bore 76, this greater flow of fluid or gas passes through radial ports 78 in adapters 77 and into expansion chamber 36 and thence, in turn, into outlet tube 38 and conduit 42 by which it is transmitted to expansion and distribution box 48. Adapters 77 may have ports 78 of a variety of selected diameters, so as to permit regulation of the rate of release of fluid or gas from cylinder 16 and hence to control the time required to inflate the safety bag 68.

From conduit 42, the fluid or gas passes through inlet tube 46 into the rear portion of expansion and distribution chamber 48 and thence through perforated baffle plate 62 whereby it is evenly diffused and permitted to expand uniformly within the forward portion of expansion and distribution box 48. From thence the gas enters safety bag 68 to expand same and provide a safety cushion between a passenger or other delicate cargo and rigid surfaces and objects within the vehicle.

Discharge ports 40 have been provided in outlet tube 38 to permit automatic deflation of safety bag 68. Discharge ports 40 are formed of sufficiently small size so as not materially to impede the rapid inflation of safety bag 68 under the high pressure of the fluid or gas contained within cylinder 16, but yet of size sufficiently large so as to permit reasonably rapid deflation of safety bag 68 when the pressure within cylinder 16 has been lowered to atmospheric pressure at which time collision will have been completed and the safety bag have accomplished its purpose. The number and diameter of apertures 64 in baffle plate 62 of expansion and distribution box 48 may also be increased or decreased to vary the rate of inflation and deflation of safety bag 68 and hence baffle plate 62 serves as a secondary timing mechanism.

Additional safety bags 68, with expansion and distribution chambers 48 and conduits 42 connected by additional outlet tubes 38 to expansion chamber 36, may be similarly disposed to provide safety for a plurality of passengers or delicate cargoes placed at various points within the vehicle. I have found it convenient to use nitrogen gas for the purpose of inflating the safety bags due to the relatively low cost and incombustibility thereof and the minimization of rusting thereby of the metal parts of my invention. However, it is to be understood that my invention is not limited to the use of nitrogen gas as the inflating medium since other fluids, both gaseous and non-gaseous, may be used for this purpose.

In a device of the type described, the time lapse intermediate closing of pressure sensitive switch 138 and full inflation of safety bag 68 is of great importance. The use of an electrically actuated explosive charge, and the elimination of a solenoid, a primary valve and mechanical linkages heretofore used for a similar purpose, prevent lost time necessarily associated with the mechanical operation and travel of such latter parts. The present invention thus reduces the time lag between actuation of pressure sensitive switch 138 and inflation of safety bag 68, an element of crucial importance in the art. Provision is made, however, as hereinabove stated, for the selective use of smaller radial ports 78 within adapters 77 to retard the flow of fluid or gas from valve 34 and hence to slow inflation of safety bag 68 in situations where a slower rate of inflation of the safety bag may be appropriate. Further, a manually operated switch may be provided to energize the device in advance of an anticipated collison. The use of such a manually operated switch together with smaller radial ports 78 to permit a slower rate of inflation of safety bag 68, and, if desired, a corresponding reduction in size of discharge ports 40, is particularly useful in certain types of aircraft accidents wherein collision can be foreseen for a period of several seconds or more.

What is claimed is:
1. A safety device for use in a pasenger-carrying compartment of a vehicle, comprising:
   a container for holding a fluid under a high pressure, inflatable bag means disposed in said passenger-carrying compartment;
   conduit means connecting said container to said bag means whereby the fluid is said container can be used to inflate said bag means;
   an explosively actuated fluid valve connected in said conduit means, said valve including a plunger cylinder having a main fluid passageway provided with a valve seat;
   fluid exit port means communicating with said main fluid passageway at a point spaced from said valve seat;
   a valve stem disposed within said main fluid passageway and being spaced from the internal surface thereof, said stem having a valve head engageable with said valve seat, said stem also having a pilot fluid passageway extending through said stem and valve head;
   a plunger mounted on said valve stem and slidably disposed within a chamber;
   a diaphragm extending across said pilot fluid passageway;
   a plunger pin slidably extendable into said pilot fluid passageway, said pin having a sharp forward end capable of pentrating said diaphragm, said pin having an opening therethrough adapted to place said pilot fluid passageway in communication with said chamber when said diaphragm is penetrated;
   an explosive charge adapted when exploded to drive said pin forwardly;
   means for igniting the charge; and
   switch means mounted on the vehicle for controlling ignition of the charge.

2. A safety device for use in a passenger-carrying compartment of a vehicle, comprising:
- a container for holding a fluid under a high pressure, inflatable bag means disposed in said passenger-carrying compartment;
- conduit means connecting said container to said bag means whereby the fluid in said container can be used to inflate said bag means;
- an explosively actuated fluid valve connected in said conduit means, said valve including a plunger cylinder having a longitudinal main fluid passageway provided with a valve seat at one end thereof and a chamber at the other end thereof;
- fluid exit port means communicating with said main fluid passageway between the ends thereof;
- a valve stem disposed within said main fluid passageway and being spaced from the internal surface thereof, said stem having a valve head at one end thereof engageable with said valve seat, said stem also having a longitudinal pilot fluid passageway extending through said stem and valve head;
- a plunger mounted on the other end of said valve stem and slidably disposed within said chamber;
- a diaphragm extending across said pilot fluid passageway;
- a cylinder head mounted on said cylinder at said other end thereof, said cylinder head having a bore aligned with said pilot fluid passageway;
- a plunger pin slidably disposed within said bore and extendable into said pilot fluid passageway, said pin having a sharp forward end capable of penetrating said diaphragm, said pin having a T-shaped opening therethrough with the stem thereof being longitudinally disposed and the crossbar thereof extending laterally and adapted for communication with said chamber whereby when said diaphragm is penetrated said plunger and valve stem are moved to thereby move said valve head away from said valev seat;
- an explosive charge disposed within said bore and adapted when exploded to drive said pin forwardly;
- means for igniting the charge; and
- switch means mounted on the vehicle for controlling ignition of the charge.

References Cited by the Examiner
UNITED STATES PATENTS

| | | | |
|---|---|---|---|
| 2,477,933 | 8/49 | Labser | 296—84 |
| 2,515,068 | 7/50 | Young | 137—68 X |
| 2,620,815 | 12/52 | Margraf et al. | 137—70 |
| 2,755,125 | 7/56 | Hodges | 296—84 |
| 2,806,737 | 9/57 | Maxwell | 296—84 |
| 2,834,606 | 5/58 | Bertrand | 296—84 |
| 2,834,609 | 5/58 | Bertrand | 296—84 |
| 2,850,291 | 9/58 | Ziccardi | 296—84 |
| 2,931,665 | 4/60 | Sandor | 296—84 |

A. HARRY LEVY, *Primary Examiner.*